UNITED STATES PATENT OFFICE.

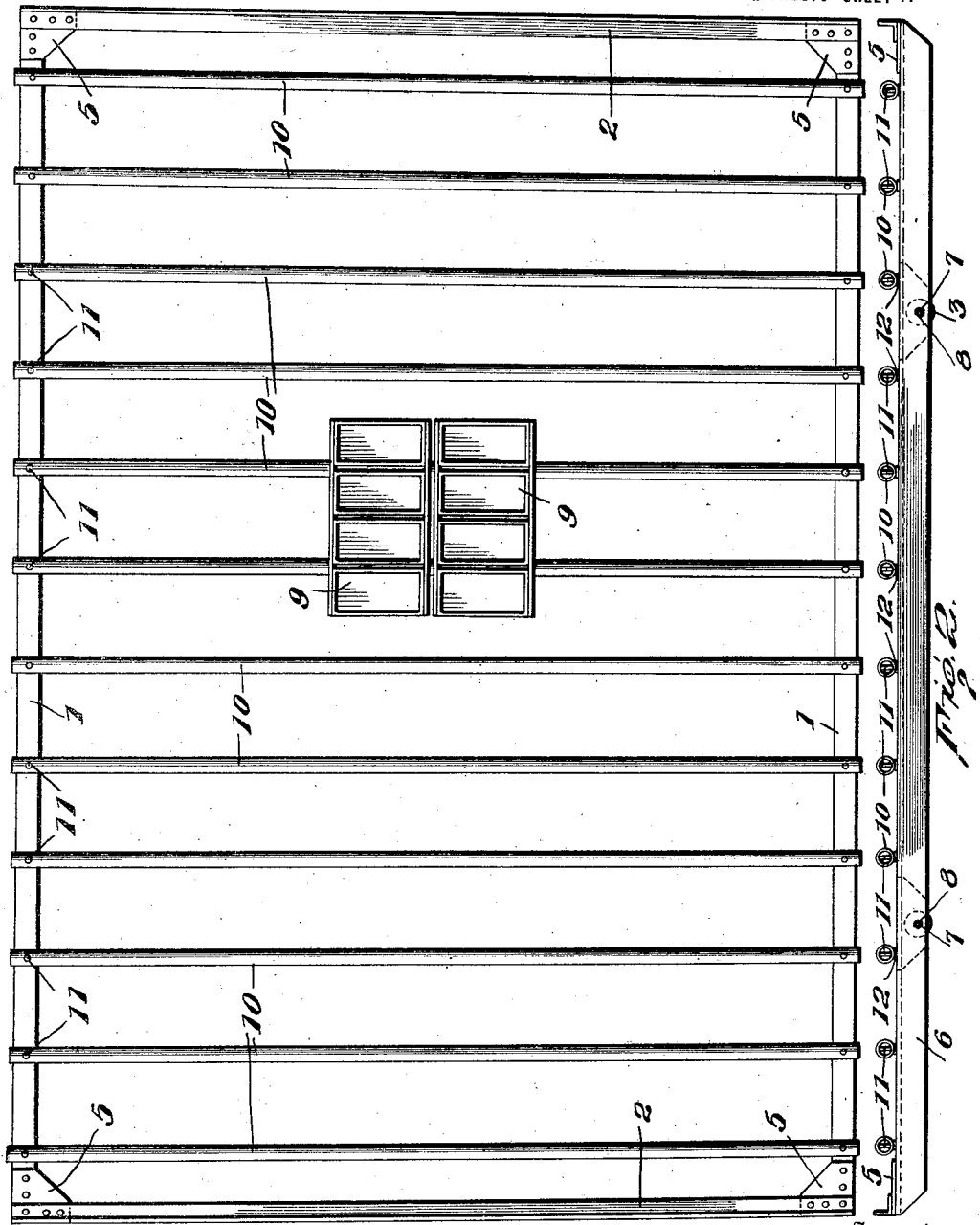

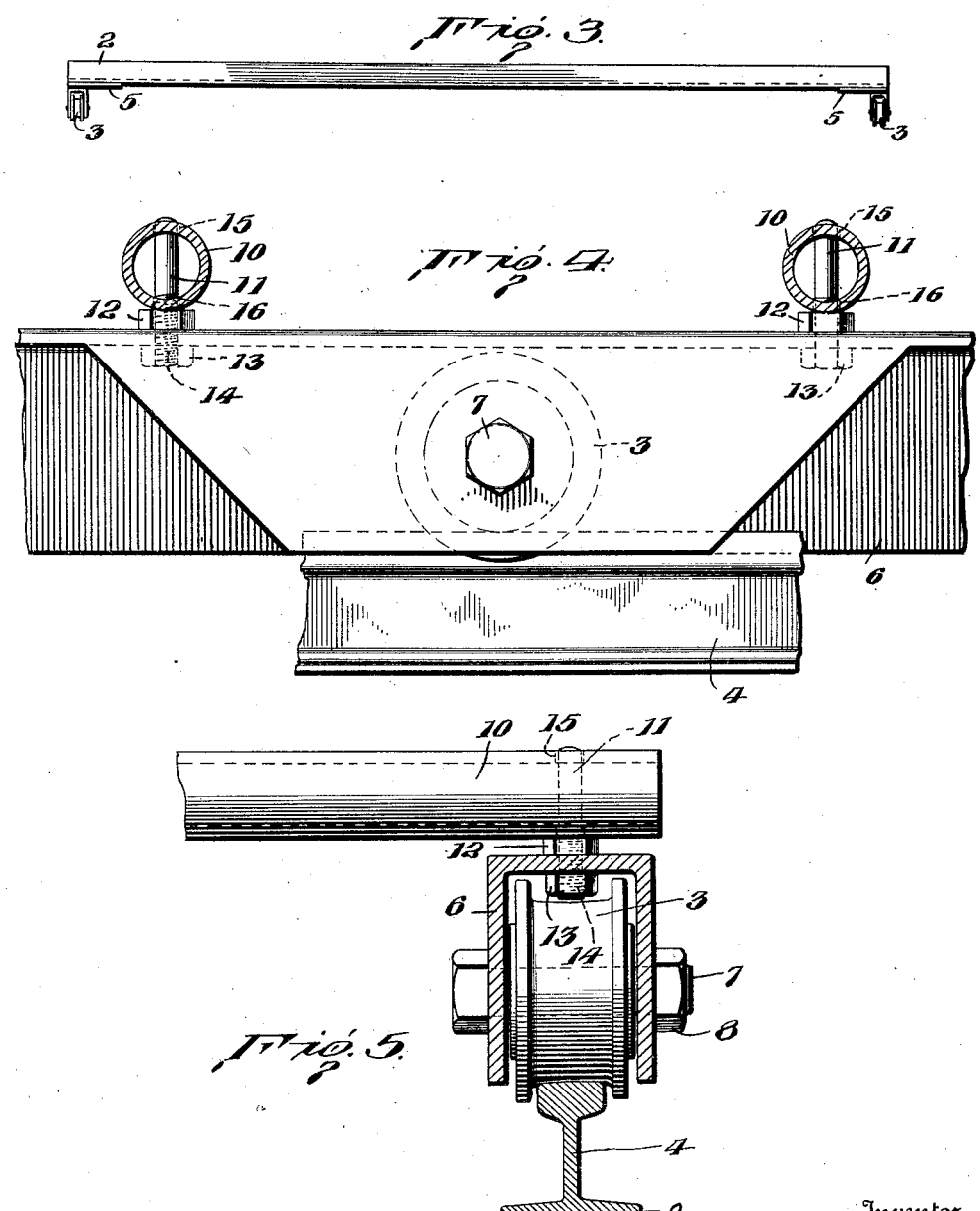

GEORGE MUELLER, OF SALT LAKE CITY, UTAH.

BREAD PAN OR OVEN TRAY.

1,408,019.  Specification of Letters Patent.  Patented Feb. 28, 1922.

Application filed May 28, 1921. Serial No. 473,360½.

*To all whom it may concern:*

Be it known that I, GEORGE MUELLER, a citizen of the United States, residing at Salt Lake City, in the county of Salt Lake and State of Utah, have invented new and useful Improvements in a Bread Pan or Oven Tray, of which the following is a specification.

The invention relates to a wheeled oven or bread pan tray or carriage.

The object of the present invention is to provide a simple, durable and efficient bread pan tray or carriage of strong and inexpensive construction designed particularly for use in connection with the baker's oven shown and described in my co-pending application No. 405,362 filed by me the 23rd day of August, 1920, but adapted also for use in analogous or similar structures and equipped with means for adjustably supporting bread pans or receptacles singly or in sets for arranging the bottoms of the pans as close as desired to the hearth whereby a better baking of the contents of the pans is obtained.

A further object of the invention is to provide a bread pan tray or carriage of this character in which the transverse pan supporting members will be less liable to sag and in which any sagging of the members will not caues any trouble through contact with the hearth.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a plan view of a bread pan tray or carriage constructed in accordance with this invention.

Figure 2 is a side elevation of the same.

Figure 3 is an end elevation of the bread pan tray or carriage.

Figure 4 is an enlarged detail side elevation of a portion of the bread pan tray or carriage illustrating the arrangement of the rollers or wheels and the means for adjustably mounting the transverse pan supporting bars or members.

Figure 5 is a transverse sectional view of the same.

In the accompanying drawings in which is illustrated the preferred embodiment of the invention, the bread ban or oven tray comprises in its construction a rectangular frame composed of side and end bars 1 and 2 mounted upon rollers or wheels 3 located at opposite sides of the bread pan or oven tray and adapted to run on oven rails 4 as explained in the aforesaid application. The side and end bars 1 and 2 which are connected by corner plates 5, are preferably angle bars, the side bars being each composed of an upper horizontal flange or wing and an outer depending vertical flange or wing, the inner flanges or wings 6 being provided at the inner sides of the rollers or wheels 3 to support the inner ends of the bolts 7 which constitute spindles or axles for the rollers or wheels and which are provided with outer nuts 8. The nuts may be locked on the bolts in any suitable manner if desired. The flanges 6 are preferably tapered downwardly as shown and they are arranged in parallelism with the outer wings or flanges of the side bars and have their lower edges in the same horizontal plane of the said outer wing or flange of the side bar. This arrangement provides a strong structure for supporting the axles or spindles 7 of the rollers or wheels 3 which are preferably flanged as shown in Figure 5. The end bars or members 2 of the frame are preferably L-shaped in cross section and consist of lower horizontal flanges and front upwardly extending wings or flanges, as clearly shown in Figure 2 of the drawings. The corner plates 5 which are riveted or otherwise secured to the angle side and end bars or members, are preferably flat horizontal plates or pieces fitted between the contiguous horizontal flanges of the side and end bars or members 1 and 2 as shown.

The pans or receptacles 9 which may be of any construction, are supported upon transverse bars or members 10 constructed of tubular metal and extending entirely across the frame of the tray or carriage and adjustably secured at their terminals to the side bars or members at intervals by means of vertical pins 11 and upper and lower nuts 12 and 13. The tubular pan supporting bars or members upon which the bread pans or baking receptacles are placed are less liable to sag under the weight of the pans and their contents than angle bars of approximately similar size and even should the tubular pan supporting bars or members sag slightly under the weight of the pans and the contents thereof, the pans will give and raise upward and not cause any trouble and the pan supporting bars or members will present convex or rounded surfaces to the hearth and not catch thereon or injure the same when the bread pan or oven tray is run into and removed from the oven. The pins 11 which pierce the upper and lower portions of the tubular pan supporting bars or members have threaded lower portions 14 to receive the upper and lower nuts 12 and 13 and the upper nuts are arranged upon the upper faces of the horizontal flanges of the side bars or members of the rectangular frame and are interposed between the same and the transverse pan supporting bars or members. The upper and lower nuts of the pins 11 firmly clamp the upper and lower faces of the horizontal flanges of the side bars or members and rigidly support the pins in projecting position with relation to the frame and the upper and lower openings 15 and 16 in the upper and lower portions of the tubular pan supporting bars or members are preferably slightly greater in diameter than the pins so that the pan supporting rods or members may be readily placed on and removed from the pins. Also it will be seen that by varying the thickness of the upper nut, the tubular pan supporting members may be raised and lowered and brought closer to, or spaced further from, the horizontal flanges of the side bars or members of the rectangular frame. This will enable the bottoms of the pans to be arranged as closely to the hearth or bottom of the furnace as desired and a better baking and maximum effect of the heat of the oven are thereby obtained. Also the pins 11 which pierce the transverse pan supporting bars or members may be fixed to the latter and the vertical adjustment may be obtained by the raising and lowering of the pins 11 through the adjustment of the upper and lower nuts and by employing upper nuts of varying thickness the bars may be brought closer to the rectangular frame of the bread pan or oven tray.

A single wheeled tray which is adapted to be rapidly run into and out of a baker's oven will enable a large number of pans of rolls, bread or the like to be easily handled in introducing the dough into the oven and in removing the baked bread, rolls or the like therefrom. The pans or receptacles for the bread, biscuits, or the like, are arranged between and hung from the transverse supporting bars or members. The pan supporting bars or members may be arranged any distance apart to suit the pans and they may extend in parallelism in any direction across the open frame. Also by using a larger or smaller nut 12 on top of the flange of the side bars, the pipes or tubular members may be arranged in such a way that they will vary from one-half to one-and-one-half inches in their adjustment. This is important in securing a maximum cooking or heating effect from a baker's oven.

What is claimed is:—

1. An oven tray comprising an open wheeled frame adapted to run into and out of a baker's oven, and tubular pan supporting members mounted on the frame and presenting convex faces to the hearth or bottom of the oven.

2. An oven tray comprising an open frame, spaced bread supporting bars or members mounted upon the frame, and means for securing the bread supporting bars or members to the frame, said means being arranged to raise and lower the said bars or members whereby the pans or receptacles may be arranged as close to the bottom or hearth of a baker's oven as desired.

3. An oven tray comprising an open frame, spaced pan supporting bars or members having their terminal portions mounted on the said frame, vertical pins projecting from the frame and connecting the terminals of the pan supporting bars or members therewith, and means for raising and lowering the pan supporting bars or members.

4. An oven tray comprising an open frame, spaced tubular pan supporting members provided with upper and lower terminal openings, and pins projecting from the frame and arranged in the said openings of the bars or members.

5. An oven tray including an open frame, spaced pan supporting bars or members, and means for adjustably connecting the bars or members with the frame, said means comprising vertical pins piercing the bars or members and having lower threaded portions and upper and lower nuts mounted on the threaded portions of the pins and clamping the frame.

6. An oven tray including an open frame, spaced pan supporting bars or members, means for adjustably connecting the bars or members with the frame, said means comprising vertical pins piercing the bars or members and having lower threaded portions, upper and lower nuts mounted on the threaded portions of the pins and clamping the frame, the upper nuts being interposed between the supporting bars or members and the frame and removable to permit upper nuts of different thicknesses to be employed for varying the distance between the pan supporting bars or members and the frame.

7. An oven tray including an open frame composed of side and end bars, the side bars being provided with outer depending flanges and having relatively short spaced inner flanges, axles connecting the inner and outer flanges of the side bars, rollers or wheels mounted on the axles, and pan supporting bars or members connected by the frame.

8. An oven tray comprising an open frame, wheels supporting the frame and adapted to run on an oven track, and pan supporting bars or members extending across the frame and having their terminals thereon and presenting lower rounded faces to the hearth or bottom of an oven.

In testimony whereof I have hereunto affixed my signature.

GEO. MUELLER.